United States Patent [19]

Nipe

[11] 3,773,666
[45] Nov. 20, 1973

[54] POLYPHTHALAMIDE THICKENED GREASES
[75] Inventor: Richard N. Nipe, Munster, Ind.
[73] Assignee: Standard Oil Company, Chicago, Ill.
[22] Filed: Sept. 20, 1971
[21] Appl. No.: 182,166

[52] U.S. Cl............................................. 252/51.5 A
[51] Int. Cl. ..................... C10m 5/20, C10m 7/34
[58] Field of Search ............................. 252/51.5 A

[56] References Cited
UNITED STATES PATENTS
2,830,954  4/1958  Dixon ........................... 252/51.5 A
2,710,839  6/1955  Swakon et al. ................ 252/51.5 A
2,830,955  4/1958  Dixon ........................... 252/51.5 A
2,971,027  2/1961  Holten ........................... 252/51.5 A
3,573,260  3/1971  Morello ........................... 260/63 N Primary Examiner—Daniel E. Wyman
Assistant Examiner—I. Vaughn
Attorney—Arthur G. Gilkes et al.

[57] ABSTRACT

Lubricating oils thickened to greases with polyphthalamides.

11 Claims, No Drawings

POLYPHTHALAMIDE THICKENED GREASES

The invention herein described was made in the course of or under a contract with the Department of the Air Force.

FIELD OF THE INVENTION

This invention relates to lubricating grease compositions in which the thickening agent is a polymeric material.

SUMMARY OF THE INVENTION

The lubricant greases of this invention comprise a liquid lubricating fluid and a thermally stable polyamide substantially free of intramolecular imido linkages.

The present invention is based on the discovery that the herein-described finely-divided solid polymeric material, which is chemically unreactive with and insoluble in the lubricating fluid, can be dispersed in the lubricating fluid to form a homogeneous fluid/thickener system that is suitable for use as a lubricant grease.

Polyamides, which are condensation products which contain recurring amide groups as integral parts of the main polymer chains, are a well known class of thermally stable polymeric materials having many uses, especially in fiber, film, coating and plastics industries. The present invention is limited to the use of this known class of polymeric materials as grease-forming thickeners in lubricating oils and fluids. Accordingly, polyamides per se and their preparation do not constitute any part of this invention.

Imido-modified polyamides, wherein the imido linkages are intramolecular, are a well-known sub-class of the general class of polyamides. For the purposes of this invention, such imido-modified polyamides are excluded. Accordingly, the polyamides embraced by this invention are those polyamides that are substantially free of intramolecular imido linkages.

Except for the limitation that the polyamides are substantially free of intramolecular imido linkages, the chemical composition and structure of these polymers are not critical with respect to their use as grease-forming thickeners in accordance with this invention. Any combination of aliphatic, aromatic or heterocyclic monomers known in the art for the preparation of thermally stable polyamides can be used. Accordingly, any polyamide substantially free of intramolecular imido linkages that is thermally stable at the temperature of intended use of the grease is suitable for the purposes of this invention.

The polymeric thickener is used in an amount sufficient to thicken the lubricating fluid or form the grease having the desired consistency or penetration. The amount is generally between about 5 and about 50 weight percent, usually between about 8 and about 30 weight percent, of the total composition.

The lubricating fluid component of the greases of this invention can be any normally liquid lubricating oil or fluid of natural or synthetic origin that is normally used in lubricant grease compositions. Illustrative of such oils are the conventional mineral lubricating oils and synthetic lubricating fluids or oils, such as silicone oils, fluorosilicone oils, polyether fluids, polyester fluids, polyfluoro fluids, etc., having viscosities within lubricating oil viscosity range.

The lubricant grease compositions of the present invention can contain, if desired, lubricant additives well known to the art without departing from the scope of the invention. For example, such greases can contain corrosion and/or rust inhibitors, E.P. agents, antioxidants, metal deactivators, stabilizers, anti-wear agents, and the like. The use of such additives and the amounts thereof depend upon the severity of the conditions to which the grease may be subjected.

The polymeric thickeners of this invention are finely-divided thermally stable solid materials which are inert and insoluble in the lubricating fluid. The term "thermally stable" means that the thickener does not melt or soften at grease operating temperatures.

The grease compositions are prepared by simply dispersing the solid polymeric thickener, in finely-divided particulate form, such as a powder, in the fluid and then milling the dispersion mixture to the desired grease consistency. Any method of mixing that imparts shearing action may be used. Preferably, the conventional grease roll mill is used to form a grease having a stable consistency or penetration. The particle size of the thickener is not critical, but the particles should be as small as possible, since it is well known that the stability of the grease is dependent upon the particle size of the solid thickener. Inasmuch as the polymeric thickener is inert and insoluble in the lubricating fluid, it is to be understood that a plurality of passes through a roll mill and adjustment of fluid content are required to obtain homogenity of the solid thickener/fluid system and effect a stable consistency in the grease.

The CRC L-35 bearing performance test was used to determine the performance of the exemplary grease formulations of this invention as bearing lubricants at elevated operating temperatures. At temperatures below 500° F, the size 204 test bearings were run in high speed test spindles at 10,000 rpm in air, with a 5 pound radial load and a 5 pound axial load on the bearing, for 20 hours out of each 24 hour period until failure. In tests at or above 500° F, the test bearings, under a 50 pound radial load and a 25 pound axial load, were run continuously at the test temperature, until failure. All tests at atmospheric pressure.

DESCRIPTION OF THE PREFERRED EMBODIMENTS

The polyamides used as thickeners in the exemplary grease formulations of this invention are:

Polymer A: poly(p-phenylene terephthalamide).
Polymer B: poly(4,4'-diphenylene terephthalamide).
Polymer C: poly(p-phenylene tetrachloroterephthalamide).
Polymer D: poly(N,N'-diphenyl-p-phenylene terephthalamide).
Polymer E: poly(4,4'-diphenyl methylene terephthalamide).
Polymer F: poly(4,40'-oxydiphenylene terephthalamide).
Polymer G: poly(terephthaloyl piperazine).
Polymer H: poly(p-phenylene isophthalamide).
Polymer I: poly(m-phenylene terephthalamide).
Polymer J: poly(ethylene terepthalamide).

Each of the above polyamides was synthesized by the conventional interfacial condensation method for the preparation of polyamides from non-anhydride-forming dicarboxylic acid and organic diamine reactants. The recovered powdered solids were then incorporated in lubricating fluids to form greases.

EXAMPLE 1

In this example the Dow-Corning silicone polymer lubricating fluid F6-7039 was thickened with the polymers described above. The lubricant grease obtained was then tested as a bearing lubricant. The respective grease formulations, having ASTM D-1403 quarter-cone penetrations of about 300, and the bearing test results are set forth in Table I:

TABLE I

| Polymer | Thickener % | Bearing Test Life (Hours) at 550° F | 600° F |
|---|---|---|---|
| A | 32.9 | 197 | 15, 19 |
| B | 27.7 | 38 | |
| C | 45.5 | | 1 |
| D | 36.6 | | 10 |
| E | 35.6 | | 13 |
| F | 38.8 | | 110, 121 |
| G | 54 | | 23 |
| H | 35 | | 17 |
| I | 33 | | 5 |
| J | 19 | | 30 |

EXAMPLE 2

The liquid lubricating fluid used in forming the greases of this example was "Krytox" 143AD, a perfluorinated polyether oil derived from hexafluoropropylene oxide. The aforesaid polymers were likewise used as the thickening agents. The greases, having quarter-cone penetrations of about 300, so formed and the bearing test results are set forth in Table II:

TABLE II

| Polymer | Thickener % | Bearing Test Life (Hours) at 550° F |
|---|---|---|
| A | 13.3 | 78 |
| B | 16 | 458 |
| C | 19.5 | 232 |
| C | 20 | 59 |
| D | 17.5 | 70 |
| E | 18.2 | 280 |
| F | 20.8 | 278 |
| G | 33 | 310 |

The synthetic lubricating fluids used in the foregoing examples are all commercially available products and are well known in the art.

I claim:

1. The grease composition comprising a lubricating fluid vehicle and a thickening amount of from about 5 to about 50 weight percent of a finely divided solid, thermally stable, interfacial condensation polymer selected from the group consisting of
   poly(p-phenylene terephthalamide),
   poly(4,4'-diphenylene terephthalamide),
   poly(4,4'-oxidiphenylene terephthalamide),
   poly(terephthaloyl piperazine),
   poly(N,N'-diphenyl-p-phenylene terephthalamide),
   poly(p-phenylene tetrachloro terephthalamide),
   poly(4,4'-diphenylmethylene terephthalamide),
   poly(p-phenylene isophthalamide),
   poly(m-phenylene terephthalamide) and
   poly(ethylene terephthalamide); said polymer being insoluble in said fluid.

2. The composition of claim 1 wherein said polymer is poly(p-phenylene terephthalamide).

3. The composition of claim 1 wherein said polymer is poly(4,40'-diphenylene terephthalamide).

4. The composition of claim 1 wherein said polymer is poly(4,4'-oxydiphenylene terephthalamide).

5. The composition of claim 1 wherein said polymer is poly(terephthaloyl piperazine).

6. The composition of claim 1 wherein said polymer is poly(N,N'-diphenyl-p-phenylene terephthalamide).

7. The composition of claim 1 wherein said polymer is poly(p-phenylene tetrachloro terephthalamide).

8. The composition of claim 1 wherein said polymer is poly(4,4'-diphenylmethylene terephthalamide).

9. The composition of claim 1 wherein said polymer is poly(p-phenylene isopthalamide).

10. The composition of claim 1 wherein said polymer is poly(m-phenylene terephthalamide).

11. The composition of claim 1 wherein said polymer is poly(ethylene terephthalamide).

* * * * *

PO-1050
(5/69)

UNITED STATES PATENT OFFICE
CERTIFICATE OF CORRECTION

Patent No. 3,773,666                                Dated November 20, 1973

Inventor(s) RICHARD N. NIPE

It is certified that error appears in the above-identified patent and that said Letters Patent are hereby corrected as shown below:

Col. 2, line 56, for "4,40'" read -- 4,4' --.

Col. 3, line 35, delete the first "C" under the Polymer heading in Table II.

Col. 4, line 23, for "4,40'" read -- 4,4' --.

Signed and sealed this 16th day of April 1974.

(SEAL)
Attest:

EDWARD M. FLETCHER, JR.
Attesting Officer

C. MARSHALL DANN
Commissioner of Patents